United States Patent [19]

Heep

[11] Patent Number: 5,741,094
[45] Date of Patent: Apr. 21, 1998

[54] PIPE SHUNT FOR PHEUMATICALLY FED BULK GOODS

[75] Inventor: Michael Heep, Weingarten, Germany

[73] Assignee: Motan-Fuller VerFahrenstechnik GmbH, Weingarten, Germany

[21] Appl. No.: 821,323

[22] Filed: Mar. 20, 1997

[51] Int. Cl.[6] ............................................. B65G 53/56
[52] U.S. Cl. ............................................. 406/182
[58] Field of Search ............................... 406/182

[56] References Cited

U.S. PATENT DOCUMENTS

| 4,138,161 | 2/1979 | Payne | 406/182 |
| 4,264,244 | 4/1981 | Steele | 406/182 |
| 4,355,930 | 10/1982 | Carlier | 406/182 |
| 4,952,100 | 8/1990 | Heep et al. | 406/182 |

FOREIGN PATENT DOCUMENTS

| 658003 | 3/1938 | Germany | 406/182 |

*Primary Examiner*—Gary C. Hoge
*Attorney, Agent, or Firm*—Daniel De Joseph

[57] ABSTRACT

A pipe shunt for pneumatically fed bulk goods, comprising a housing with three pipe connections associated with one another and one stopcock, rotatably supported in this housing by a pivot pin and connecting the three pipe connections with one another through two flow channels, each flow channel comprising one length of pipe and the two lengths of pipe being joined to one another in the region of the respective ends each via one adapter and in their middle via the pivot pin of the stopcock, characterized in that a pipe entrance disposed in the housing of the pipe shunt communicates with one at a time of the two pipe drains disposed in the housing through a flexibly embodied spiral hose that communicates with these pipe connections, is prestressed in curved fashion between them, and is disposed with a slide with supporting angle brackets.

9 Claims, 3 Drawing Sheets

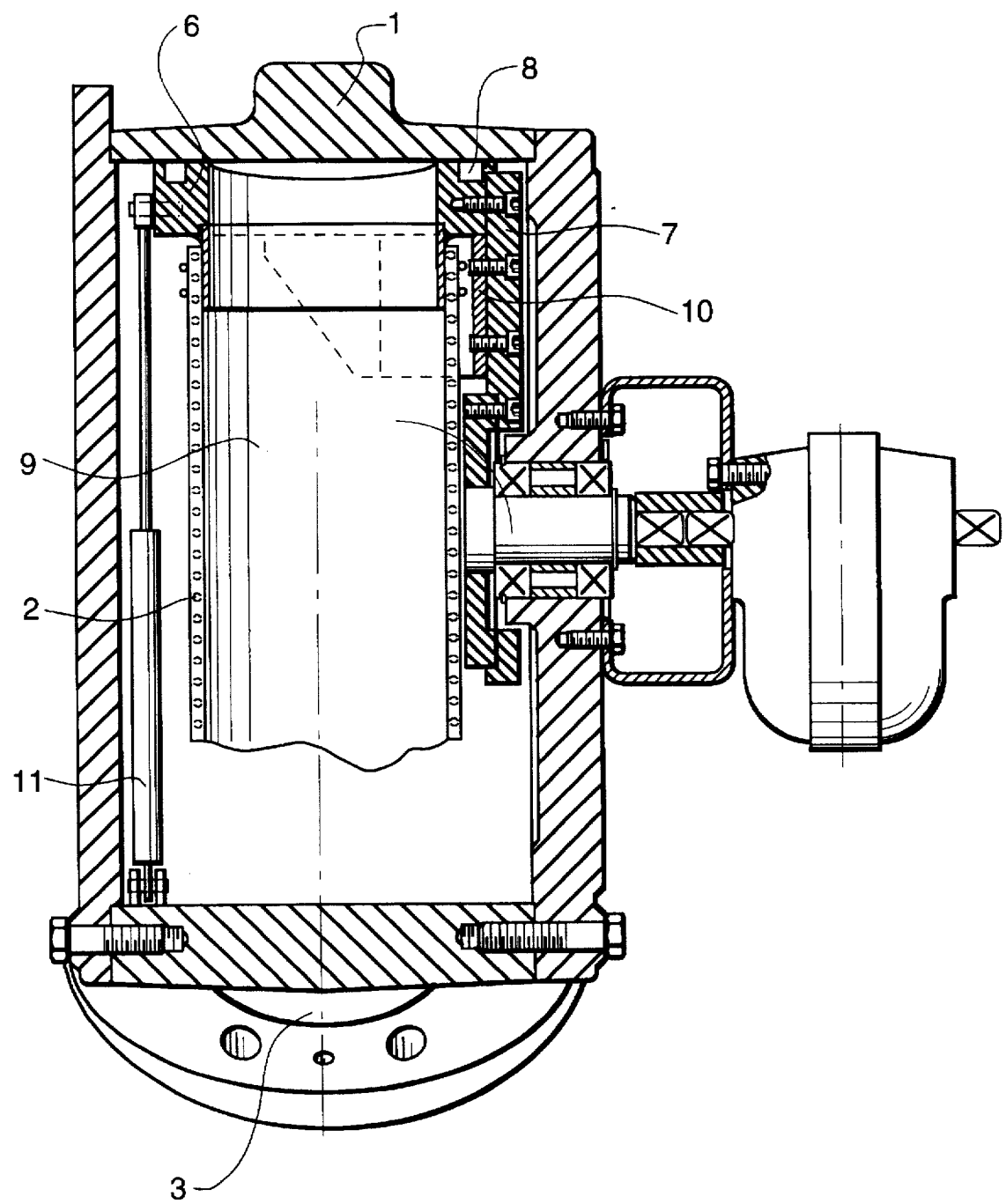

PIPE SHUNT FOR PNEUMATICALLY FED BULK GOODS

FIELD OF THE INVENTION

The subject of the invention is a pipe shunt for pneumatically fed bulk goods.

BACKGROUND OF THE INVENTION

A pipe shunt of this kind is known from German Patent DE 38 17 349 C2.

It serves to carry bulk goods within a pneumatic feed line from the discharge location to the desired reception site and can be used in the suction or compression mode. Because of its design, it is known as a "stopcock shunt". Seated in a closed housing is a rotatable stopcock that establishes the communication from the shunt inlet to the shunt outlet by means of one or two channels.

The particular model of stopcock in the housing of the pipe shunt, whether conical, cylindrical or partially spherical, with a round or polygonal passage, does not matter.

Elastomer static or inflatable seals or metal pressure fittings close the gaps at the apertures in the housing around the channels of the stopcocks and thus make the desired flow path tight.

The stopcocks are usually of metal, such as aluminum, nickel-chromium steel, or hardened cast special steel and are thus optically adapted for most bulk goods. The drainage angles of the housing drains are between 35° and 45°, and despite slight manufacturer-specific differences, the shunts are considered to be standardized, since with a compact, closed design they not only perform their function but also meet the demands for accident protection and environmental protection in a time-tested way.

This shunt embodiment has proved to be disadvantageous, however, whenever bulk goods, such as titanium dioxide, soot or E-PVC, whose properties cause them to stick to joints or elbows in the pipeline must be fed.

These substances built up, thus impairing pneumatic feeding, at the deviation (35° to 45°) inside the pipe shunt.

Only partial success was achieved by coating the stopcock channels with plastic.

German Patent Disclosure DE 1 825 073 has disclosed a shunt with three drains that instead of a stopcock uses a rubber hose pressed against the pipe by spring action.

In the middle position, the hose is smooth and straight from the shunt inlet to the shunt outlet; in the left- and right-hand side positions, however, because of its kinking at the center point of the axis of rotation, it forms an undesirable crease.

Disadvantageous features of such prior art versions are the material orifice and the impact of bulk goods on the kink point.

OBJECT AND SUMMARY OF THE INVENTION

The object of the invention is to create a pipe shunt of the generic type referred to at the outset that makes it possible, without sacrificing the advantages of the known cap shunt technology, to make the stopcock shunt operationally safe by means of exchange as in modular technology, even for bulk goods from among the list of pigments.

This object is attained according to the invention by the characteristics recited in the body of claim 1.

The nucleus of the invention is that the stopcock is replaced by a flexible spiral plastic hose and is disposed such that both in the straight shunt position and the diagonal shunt position, it is prestressed in curved fashion in such a way that the bulk goods, if they should stick, will fall off the inner wall of the hose by centrifugal force at the largest outer radius on changing position, so that an influence can even be exerted on wall deposits preventively.

In contrast to the stopcock shunt technology known from German Patent DE 28 17 349 C2, the present invention is characterized by the spiral hose that can advantageously be used, particularly for such hard-to-feed bulk goods as titanium dioxide, soot or E-PVC; this spiral hose is used instead of the stopcock and connects the pipe entrance to one at a time of the two pipe drains, is rotatably supported in the region of the pipe drains on the inner wall of the housing of the pipe shunt, and is especially embodied, preferably comprising a plastic such as polyurethane with an advantageous self-cleaning effect.

In a first embodiment of the invention it is provided that by means of a guide arm, supported on one end, of the seal carrier, a 360° motion of the axis of the spiral hose is possible, the spiral hose being axially movable, i.e., rotationally movable about the longitudinal axis, with the pipe entrance and the slide and being connected by means of the slide to one of the two pipe drains at a time, thus providing an additional self-cleaning effect of the spiral hose in the direction of the drive shaft.

In another advantageous embodiment it is provided that a gas compression spring is used, which at one end engages the part of the spiral hose that is solidly joined to the pipe entrance of the shunt and with its resilient end is braced against the rotatably supported slide connected to the other part of the spiral hose.

A gas compression spring of this kind has the substantial advantage over the use of a screw, known from German Utility Model DE 1 825 073 U1 that exerts constant pressure as it moves along the inner housing wall that it develops a spring force in the axial direction only whenever the slide joined to the spiral hose is coupled to one of the two pipe drains of the pipe shunt; this assures very low-wear operation because friction is only intermittent and slight. This also protects the seal from wear and makes it unnecessary to use helical compression springs.

A further substantial advantage of the invention results from the spiral hose which is prestressed according to the invention up to 180° between the pipe entrance and the respective pipe drain of the pipe shunt; as a result, the bulk goods located on its inner wall drop from the inner wall of the hose on changing position from one pipe drain to the other pipe drain.

The remainder of the embodiment of the invention can be learned from the other dependent claims.

The subject of the present invention is the result not only of the subject of the individual patent claims but also of the combination of the individual patent claims with one another. All the indications and characteristics disclosed in the text, including the abstract, and in particular the three-dimensional embodiment shown in the drawing are claimed as essential to the invention, to the extent that they are novel individually or in combination over the prior art.

The invention is described below in further detail in conjunction with drawings, which show merely one possible embodiment. Other characteristics essential to the invention and advantages of the invention will become apparent from the drawings and the description.

BRIEF DESCRIPTION OF THE DRAWINGS

FIG. 3 is a schematic, perspective sectional view of a spiral hose drive assembly.

DESCRIPTION OF THE EXEMPLARY EMBODIMENT

Figure 1:
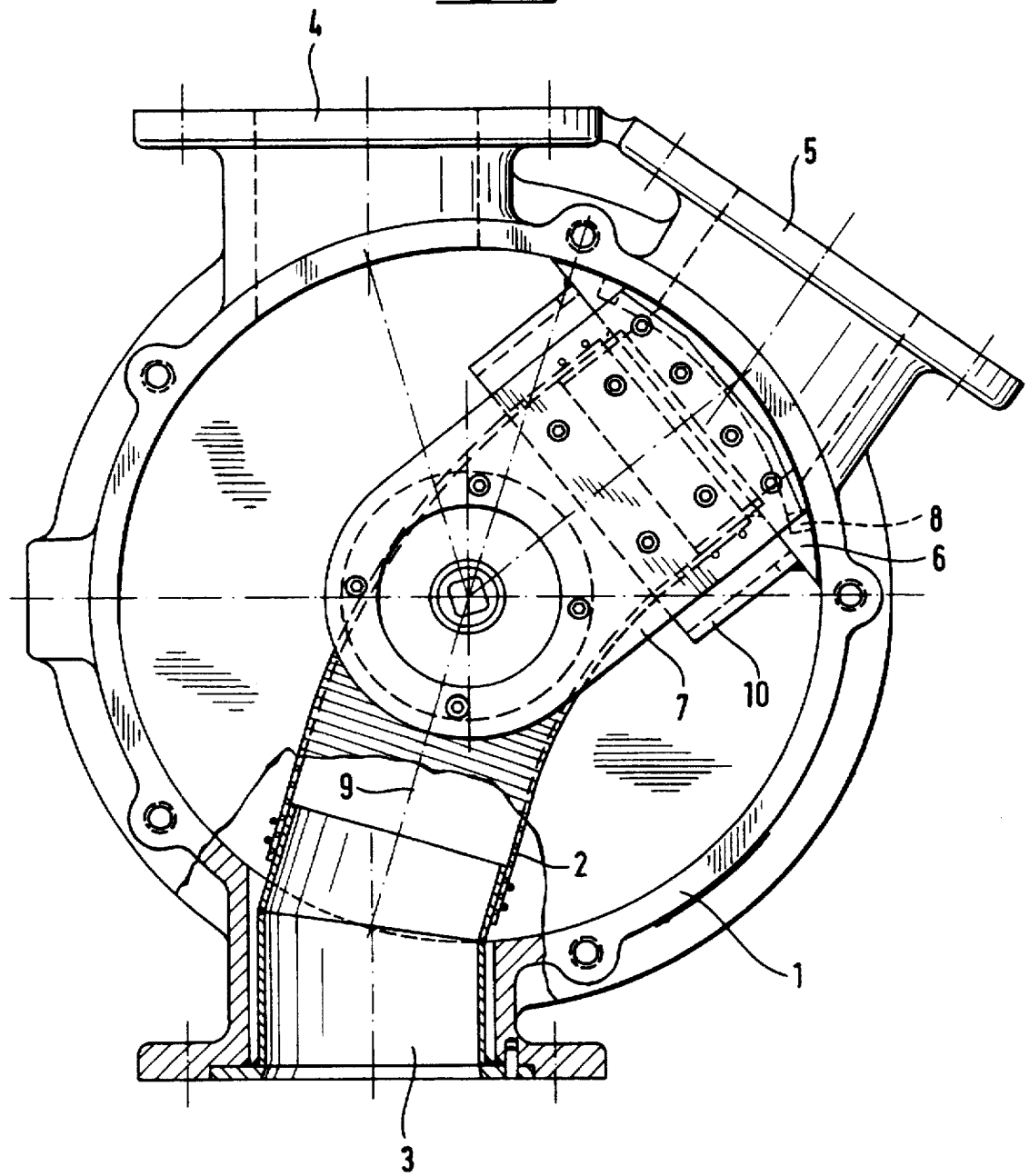
FIG. 1 is a schematic front view of a pipe shunt.
Figure 2:
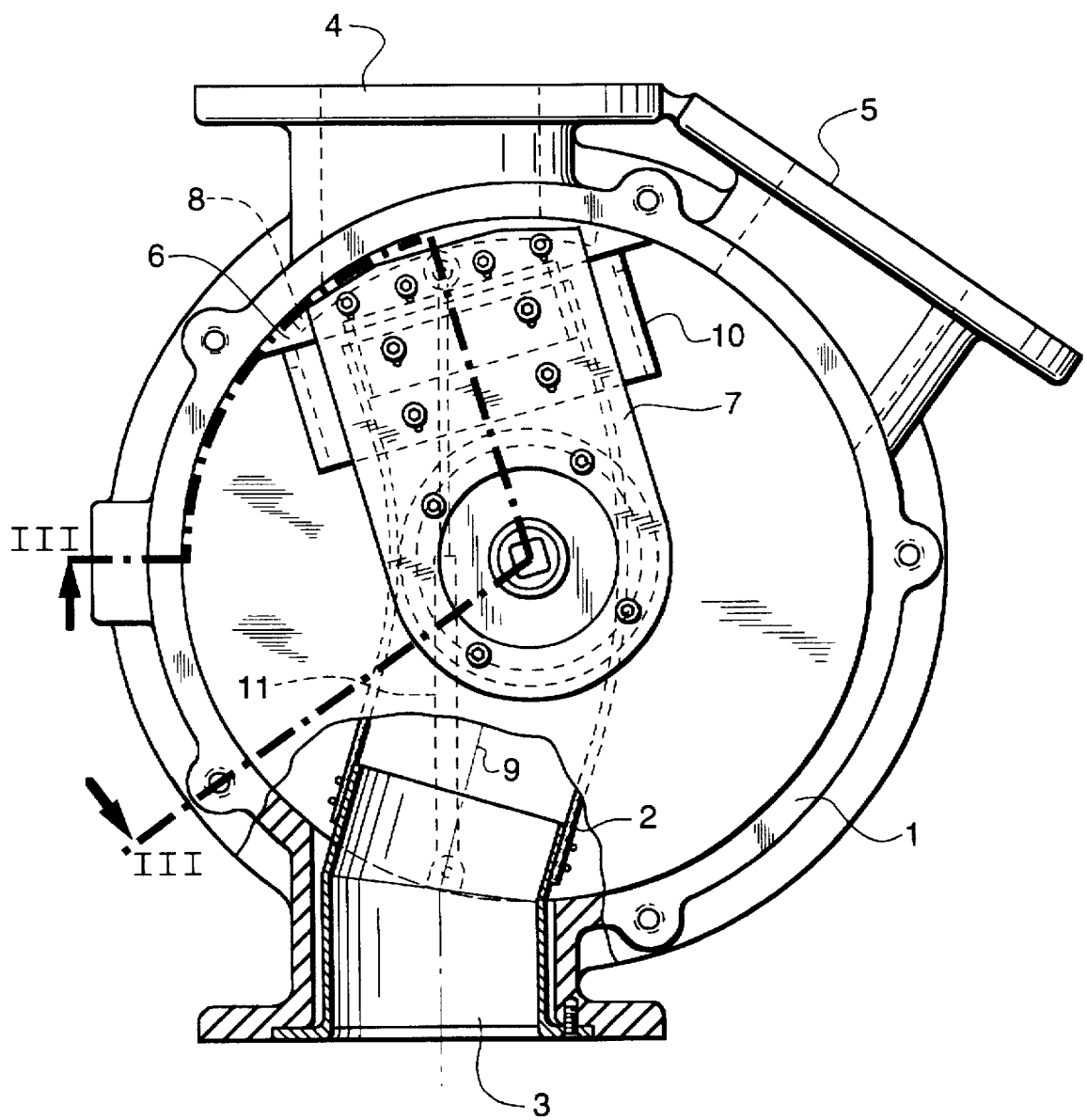
FIG. 2 is a further schematic front view of a pipe shunt.

In FIGS. 1 and 2, the housing 1 of the pipe shunt is provided both with one pipe entrance 3 and two pipe drains 4, 5, which are joined to one another by a flexibly embodied spiral hose 2, preferably of a plastic such as polyurethane, that is disposed in prestressed in curved fashion between them and is connected to a slide 6 with supporting angle brackets 10; the spiral hose 2 communicating with the pipe entrance 3 communicates with one at a time of the two pipe drains 4, 5 by means of the slide 6 solidly joined to it.

The slide 6 disposed on one end of the spiral hose 2 is rotatably supported on the inner wall of the housing 1 in the housing region of the two pipe drains 4, 5.

The flexibly embodied spiral hose 2 connecting the pipe entrance 3 to one of the two pipe drains 4, 5 at a time can be prestressed in curved fashion up to an angle of 180° between these pipe connections 3, 4, 5. The essential advantage of this curved prestressing of the spiral hose 2 in the housing 1 of the pipe shunt is that the bulk goods sticking to the inner wall of the housing drop off automatically on a change of position of the spiral hose 1 from the pipe drain 4 to the drain 5 or from the pipe drain 5 to the drain 4. As a result of this prestressing, according to the invention, of the spiral hose 2 between the pipe connections 3, 4, 5, it is possible to exert preventing influence on the undesired deposit of bulk goods on the inner wall.

From FIG. 3, another advantageous feature of the invention can be seen with regard to the 360° mobility of the axis 9 of the spiral hose 2 in the direction of the drive shaft through a guide arm 7, supported on one end, of the seal carrier 8; in this special embodiment of the invention, the spiral hose 2 is axially rotatably connected to the pipe entrance 3 and the slide 6.

The advantage of this further feature of the invention is in particular that additional cleaning motions of the spiral hose 2 in the direction of the drive shaft are possible; this further increases the self-cleaning effect of the spiral hose 2. As shown in FIGS. 2 and 3, it is provided in a further embodiment of the invention that a gas compression spring 11 be used, which on one end engages the part of the spiral hose 2 communicating with the pipe entrance 3 and with its resilient end is braced against the slide 6 that is disposed on the other end of the spiral hose 2 and is rotatably supported on the inner wall of the housing 1 in the region of the two pipe drains 4, 5.

This gas compression spring assembly 11 has the substantial advantage over the known helical compression spring assembly that a spring force is developed in the axial direction only whenever the slide is coupled with one or the other pipe drain 4 or 5, so that as a result of the only intermittent and hence slight friction, a low-wear operation that protects the seal is assured.

The spiral hose 2, which is of an extremely abrasion-proof, highly flexible plastic, such as polyurethane, which is smooth on the inside and therefore fluidically optimal and moreover is antistatic and electrically conductive and has low flammability, with a spiral, preferably a spring steel coil, cast into the hose wall can have various edge thicknesses of approximately 0.7 mm to 2.1 mm, to suit manifold intended uses, and may moreover be embodied as colored or transparent.

I claim:

1. A pipe shunt for pneumatically fed bulk goods, comprising a housing with first, second and third pipe connections disposed in the housing and associated with one another; said first pipe connection being a pipe entrance and said second and third pipe connections each being a pipe drain, wherein the pipe entrance disposed in the housing of the pipe shunt communicates, one at a time, with each of the two pipe drains disposed in the housing through a flexible spiral hose that communicates with the pipe connections and is prestressed in curved fashion between them.

2. The pipe shunt of claim 1, further comprising a guide arm, which is supported on one end of a seal carrier and provides a 360° motion of the axis of the spiral hose, with the spiral hose being axially movable with the pipe entrance and the slide and being connected by means of the slide to one of the two pipe drains at a time.

3. The pipe shunt of claim 1, further comprising a gas compression spring, which on one end engages the part of the spiral hose communicating with the pipe entrance and which with its other resilient end is supported on the slide that communicates with the other end of the spiral hose and is rotatably disposed on the inner wall of the housing of the pipe shunt.

4. The pipe shunt of claim 3, wherein the flexible spiral hose is prestressed with a precurvature of up to 180° between the pipe connections disposed in the housing of the pipe shunt, and comprises a plastic and is embodied in a manner fixed against relative rotation and displacement by a spiral that is cast into the hose wall.

5. The pipe shunt of claim 4, wherein the spiral hose comprises a softener-free polyurethane.

6. The pipe shunt of claim 4, wherein the spiral is a spring steel coil.

7. The pipe shunt of claim 4, wherein the spiral hose has a wall thickness of approximately 0.7 mm to approximately 2.1 mm and is abrasion-resistant, highly flexible and has a smooth inside fluidically optimal surface, and is antistatic, electrically conductive, and of low flammability.

8. A pipe shunt for pneumatically fed bulk goods, comprising a housing with first, second and third pipe connections disposed in the housing and associated with one another; said first pipe connection being a pipe entrance and said second and third pipe connections each being a pipe drain, wherein the pipe entrance disposed in the housing of the pipe shunt communicates, one at a time, with each of the two pipe drains disposed in the housing through a flexible spiral hose that communicates with the pipe connections and is prestressed in curved fashion between them, wherein said spiral hose further is disposed with a slide with supporting angle brackets; a guide arm, which is supported on one end of a seal carrier located adjacent the housing and provides a 360° motion of the axis of the spiral hose, with the spiral hose being axially movable with the pipe entrance and the slide and being connected by means of the slide to one of the two pipe drains at a time; and a gas compression spring, which on one end engages the part of the spiral hose communicating with the pipe entrance and which with its other resilient end is supported on the slide that communicates with the other end of the spiral hose and is rotatably disposed on the inner wall of the housing of the pipe shunt.

9. The pipe shunt of claim 8, wherein the flexible spiral hose is prestressed with a precurvature of up to 180° between the pipe connections disposed in the housing of the pipe shunt, and comprises a plastic and is embodied in a manner fixed against relative rotation and displacement by a spiral that is cast into the hose wall.

* * * * *